United States Patent
Sugahara

(10) Patent No.: US 11,921,002 B2
(45) Date of Patent: Mar. 5, 2024

(54) POWER TRANSMISSION DEVICE HAVING A BELT MOUNTING TENSION ACQUISITION UNIT

(71) Applicant: FANUC CORPORATION, Yamanashi (JP)

(72) Inventor: Keisuke Sugahara, Yamanashi-ken (JP)

(73) Assignee: FANUC CORPORATION, Yamanashi (JP)

( * ) Notice: Subject to any disclaimer, the term of this patent is extended or adjusted under 35 U.S.C. 154(b) by 898 days.

(21) Appl. No.: 16/919,462

(22) Filed: Jul. 2, 2020

(65) Prior Publication Data

US 2021/0010899 A1    Jan. 14, 2021

(30) Foreign Application Priority Data

Jul. 11, 2019  (JP) .................... 2019-128895

(51) Int. Cl.
| | |
|---|---|
| *G01M 13/023* | (2019.01) |
| *F02B 67/06* | (2006.01) |
| *F02B 77/08* | (2006.01) |
| *F16H 7/08* | (2006.01) |
| *F16H 55/36* | (2006.01) |

(52) U.S. Cl.
CPC ........... *G01M 13/023* (2013.01); *F02B 67/06* (2013.01); *F02B 77/081* (2013.01); *F16H 7/08* (2013.01); *F16H 55/36* (2013.01); *F16H 2007/0861* (2013.01)

(58) Field of Classification Search
CPC ..... G01M 13/023; F02B 67/06; F02B 77/081; F16H 7/08; F16H 55/36; F16H 2007/0861
See application file for complete search history.

(56) References Cited

U.S. PATENT DOCUMENTS

| | | | | |
|---|---|---|---|---|
| 5,698,796 | A * | 12/1997 | Hirano | .......... G01L 5/042 73/160 |
| 5,877,431 | A * | 3/1999 | Hirano | .......... G01H 13/00 73/862.41 |
| 6,164,947 | A | 12/2000 | Miyahara | |
| 6,834,631 | B1 * | 12/2004 | Blackburn | .......... F02N 11/0848 474/135 |

(Continued)

FOREIGN PATENT DOCUMENTS

| | | |
|---|---|---|
| JP | 11-262932 A | 9/1999 |
| JP | 2002172672 A | 6/2002 |

(Continued)

*Primary Examiner* — Eric S. McCall
(74) *Attorney, Agent, or Firm* — Robert P. Michal, Esq.; Carter, DeLuca & Farrell LLP

(57) ABSTRACT

A power transmission device includes: a first pulley; a second pulley having a diameter equal to or larger than a diameter of the first pulley; a belt wound around the first pulley and the second pulley; and a detection unit configured to detect a displacement of the belt in a direction intersecting the surface of the belt. The detection unit is configured to detect the displacement of the belt at a predetermined measuring point. The distance from the border between a portion where the belt and the first pulley are in contact with each other and a portion where the belt and the first pulley are not in contact with each other, to the measuring point is equal to or smaller than the diameter of the first pulley.

19 Claims, 4 Drawing Sheets

(56) References Cited

U.S. PATENT DOCUMENTS

| | | | |
|---|---|---|---|
| 9,228,909 B1* | 1/2016 | Rembisz | F16H 7/02 |
| 10,753,813 B1* | 8/2020 | Stork | G01M 13/023 |
| 10,962,428 B1* | 3/2021 | Olszewski | G01L 5/047 |
| 2003/0199349 A1* | 10/2003 | Sands | B65G 39/16 |
| | | | 198/806 |
| 2004/0066521 A1* | 4/2004 | Swab | G01L 5/042 |
| | | | 356/614 |
| 2010/0182001 A1* | 7/2010 | Furukawa | B65G 43/02 |
| | | | 324/241 |
| 2011/0050213 A1* | 3/2011 | Furukawa | B65G 43/04 |
| | | | 324/228 |
| 2015/0217472 A1* | 8/2015 | Adair | B26D 1/12 |
| | | | 83/72 |
| 2015/0260264 A1* | 9/2015 | Petridis | F16H 7/08 |
| | | | 474/101 |
| 2017/0313523 A1* | 11/2017 | Hou | B65G 43/02 |
| 2018/0106346 A1* | 4/2018 | Gonzalez-Mohino | F16H 7/02 |
| 2018/0354725 A1* | 12/2018 | Hou | G01B 21/16 |
| 2020/0032883 A1* | 1/2020 | Chinnel | G01L 5/04 |
| 2020/0400705 A1* | 12/2020 | Andler | E05F 15/627 |
| 2021/0101753 A1* | 4/2021 | Kataria | B65G 23/44 |
| 2021/0302250 A1* | 9/2021 | Olszewski | G01L 5/102 |
| 2023/0213088 A1* | 7/2023 | Kume | B25J 9/1045 |
| | | | 74/89.22 |

FOREIGN PATENT DOCUMENTS

| | | |
|---|---|---|
| JP | 3416843 | 4/2003 |
| JP | 2003184967 A | 7/2003 |
| JP | 2004137040 A | 5/2004 |
| JP | 2008133918 A | 6/2008 |
| JP | 2016136032 A | 7/2016 |
| JP | 2019074506 A | 5/2019 |

* cited by examiner

POWER TRANSMISSION DEVICE HAVING A BELT MOUNTING TENSION ACQUISITION UNIT

CROSS-REFERENCE TO RELATED APPLICATION

This application is based upon and claims the benefit of priority from Japanese Patent Application No. 2019-128895 filed on Jul. 11, 2019, the contents of which are incorporated herein by reference.

BACKGROUND OF THE INVENTION

Field of the Invention

The present invention relates to a power transmission device and an industrial machine.

Description of the Related Art

Japanese Patent No. 3416843 discloses an injection molding machine provided with a belt detecting unit that detects the presence or absence of a transmission belt. According to Japanese Patent No. 3416843, it is possible to detect breakage or the like of the transmission belt.

SUMMARY OF THE INVENTION

However, the injection molding machine of Japanese Patent No. 3416843 cannot detect a belt abnormality occurring before the belt breaks, more specifically, a decrease in mounting tension of the belt.

It is therefore an object of the present invention to provide a power transmission device and an industrial machine capable of beneficially detecting a decrease in the mounting tension of a belt.

A power transmission device according to one aspect of the present invention includes: a first pulley; a second pulley having a diameter equal to or larger than a diameter of the first pulley; a belt wound around the first pulley and the second pulley; and a detection unit configured to detect a displacement of the belt in a direction intersecting the surface of the belt. The detection unit is configured to detect the displacement of the belt at a predetermined measuring point; and a distance from a border between a portion where the belt and the first pulley are in contact with each other and a portion where the belt and the first pulley are not in contact with each other, to the measuring point is equal to or smaller than the diameter of the first pulley.

An industrial machine according to another aspect of the present includes a power transmission device as above.

According to the present invention, it is possible to provide a power transmission device and an industrial machine capable of beneficially detecting a decrease in the mounting tension of the belt.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

A power transmission device and an industrial machine according to the present invention will be detailed below by describing a preferred embodiment with reference to the accompanying drawings.

Embodiment

Figure 1:
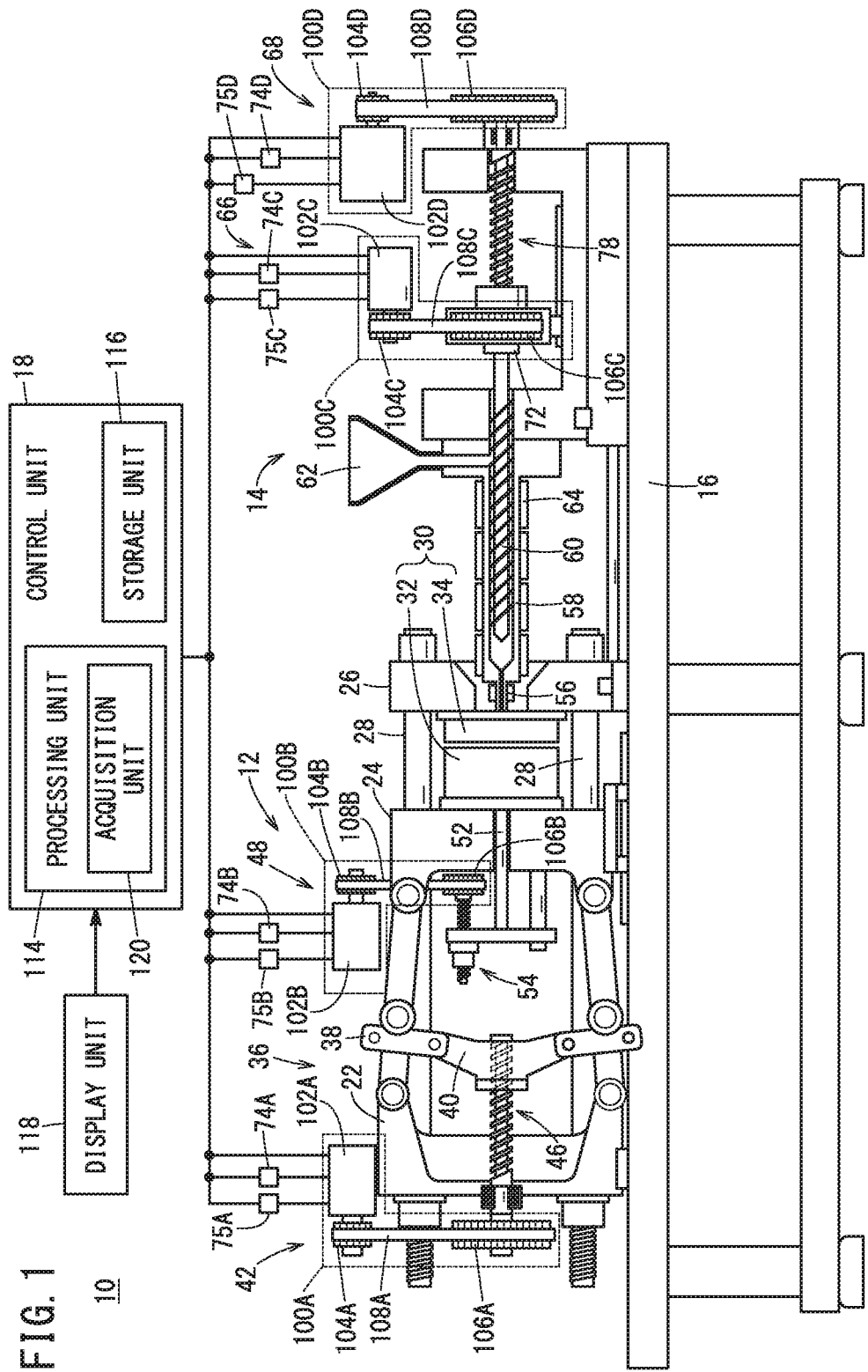
FIG. 1 is a schematic diagram showing an industrial machine according to an embodiment.

A power transmission device and an industrial machine according to one embodiment will be described with reference to FIGS. 1 to 3. FIG. 1 is a schematic diagram showing an industrial machine according to the present embodiment. Herein, an example in which an industrial machine 10 is an injection molding machine will be described, but the invention is not limited to this.

The industrial machine 10 includes a clamping device 12 and an injection device 14. The clamping device 12 and the injection device 14 are installed on a base 16. The industrial machine 10 further includes a control unit (control device) 18 that controls the clamping device 12 and the injection device 14. The industrial machine 10 further includes a display unit (display) 118.

The clamping device 12 is provided with a rear platen 22, a moving platen 24 and a stationary platen 26. The moving platen 24 can move back and forth along a tie bar 28 arranged between the rear platen 22 and the stationary platen 26.

A mold 30 is provided between the moving platen 24 and the stationary platen 26. The mold 30 is provided with a movable mold half 32 and a fixed mold half 34. The movable mold half 32 is attached to the moving platen 24. The fixed mold half 34 is attached to the stationary platen 26.

A toggle link 36 is arranged between the rear platen 22 and the moving platen 24. The toggle link 36 is connected to a crosshead 40 via a crosslink 38.

The clamping device 12 further includes a mold opening/closing mechanism 42. The mold opening/closing mechanism 42 can move the moving platen 24 forward and backward with respect to the stationary platen 26. The mold opening/closing mechanism 42 is provided with a power transmission device 100A. The power transmission device 100A includes a drive source (mold opening/closing motor) 102A, a pulley (drive pulley, first pulley) 104A, a pulley (driven pulley, second pulley) 106A, and a belt 108A. Reference numeral 100 is used to describe the power transmission devices when general mention is made, and reference numerals 100A to 100D are used to describe individual power transmission devices. Reference numeral 102 is used to describe the drive sources in general, and reference numerals 102A to 102D are used to describe individual drive sources. Reference numerals 104 and 106 are used to generally describe the pulleys, and reference numerals 104A to 104D and 106A to 106D are used to describe individual pulleys. Reference numeral 108 is used to describe the belts when general mention is made, and reference numerals 108A to 108D are used to describe individual belts. The belt 108A is wound around the pulley 104A and the pulley 106A to transmit the rotational force of the pulley 104A to the pulley 106A. The driving of the drive source 102A can be controlled by the control unit 18.

The rotational motion of the drive source 102A is transmitted to a ball screw mechanism 46 connected to the crosshead 40. The rotational motion transmitted from the drive source 102A is converted into the forward/backward motion of the crosshead 40 by the ball screw mechanism 46. The forward/backward motion of the crosshead 40 is transmitted to the moving platen 24 via the toggle link 36. In this way, the moving platen 24 can be moved back and forth with respect to the stationary platen 26.

An information acquisition unit 74A is connected to the drive source 102A. For example, a signal corresponding to the torque of the drive source 102A, more specifically, a signal indicating the magnitude of electric current that is supplied to the drive source 102A is input to the information acquisition unit 74A. The information acquisition unit 74A supplies information indicating the torque of the drive source 102A to the control unit 18.

The power transmission device 100A further includes detection units (detectors, sensors) 110A and 110B (see FIG. 2) as described later. Reference numeral 110 is used to describe the detection units when general mention is made, and reference numerals 110A and 110B are used to describe individual detection units. The detection units 110 provided in the power transmission device 100A supply a signal corresponding to the displacement of the belt 108A in the direction intersecting the surface of the belt 108A to an aftermentioned information acquisition unit 75A. Reference numeral 75 is used to describe information acquisition units when general mention is made, and reference numerals 75A to 75D are used to describe individual information acquisition units.

The information acquisition unit 75A is connected to the detection unit 110 provided in the power transmission device 100A. The information acquisition unit 75A includes an interface board to which the signal supplied from the detection unit 110 is input. The information acquisition unit 75A determines, for example, whether or not the displacement of the belt 108A is equal to or more than a displacement threshold (displacement amount threshold) (i.e., whether the displacement the displacement threshold), based on the signal supplied from the detection unit 110 of the power transmission device 100A. The displacement threshold is a threshold for determining whether or not the displacement of the belt 108 occurs. The information acquisition unit 75A supplies the information thus obtained, that is, the information regarding the displacement of the belt 108A, to the control unit 18.

The clamping device 12 includes an ejector mechanism 48. The ejector mechanism 48 is to take out a molded product from the movable mold half 32. The ejector mechanism 48 is provided with a power transmission device 100B. The power transmission device 100B includes a drive source (ejector motor) 102B, a pulley 104B, a pulley 106B, and a belt 108B. The belt 108B is wound around the pulley 104B and the pulley 106B to transmit rotational force from the pulley 104B to the pulley 106B. The driving of the drive source 102B can be controlled by the control unit 18.

The rotational motion of the drive source 102B is transmitted to a ball screw mechanism 54 connected to an ejector pin 52. The ball screw mechanism 54 converts the rotational motion transmitted from the drive source 102B into the forward/backward motion of the ejector pin 52. Thus, the ejector pin 52 can be moved back and forth with respect to the moving platen 24. When the ejector pin 52 is moved toward the moving platen 24, the molded product is pushed from the movable mold half 32 and taken out.

An information acquisition unit 74B is connected to the drive source 102B. For example, a signal corresponding to the torque of the drive source 102B, more specifically, a signal indicating the magnitude of an electric current supplied to the drive source 102B, for example, is input to the information acquisition unit 74B. The information acquisition unit 74B supplies information indicating the torque of the drive source 102B, to the control unit 18.

The power transmission device 100B further includes a detection unit 110. The detection unit 110 in the power transmission device 100B supplies a signal corresponding to the displacement of the belt 108B in the direction intersecting the surface of the belt 108B to an aftermentioned information acquisition unit 75B.

The information acquisition unit 75B is connected to the detection unit 110 included in the power transmission device 100B. The information acquisition unit 75B includes an interface board to which the signal supplied from the detection unit 110 is input. The information acquisition unit 75B determines, for example, whether or not the displacement of the belt 108B is equal to or more than a displacement threshold (i.e., whether the displacement the displacement threshold), based on the signal supplied from the detection unit 110 in the power transmission device 100B. The information acquisition unit 75B supplies the information thus acquired, that is, the information regarding the displacement of the belt 108B, to the control unit 18.

The injection device 14 includes a nozzle 56, a cylinder 58, a screw 60, a hopper 62, and a heater 64. The nozzle 56 is arranged at the front end of the cylinder 58. The cylinder 58 is composed of a hollow member. The screw 60 is inserted into the cylinder 58. The cylinder 58 and the screw 60 extend in the opening/closing direction of the mold 30. The hopper 62 is connected to the cylinder 58. The hopper 62 is configured to load resin material into the cylinder 58. When the resin material charged from the hopper 62 is in the form of pellets, the heater 64 melts the resin material.

The injection device 14 includes a resin feed mechanism 66 and an injection mechanism 68. The resin feed mechanism 66 conveys (feeds) the resin material in the cylinder 58 toward the nozzle 56 of the cylinder 58. The injection mechanism 68 injects the resin material into the mold 30. The resin feed mechanism 66 has a power transmission device 100C. The power transmission device 100C includes a drive source (motor for rotational motion) 102C, a pulley 104C, a pulley 106C, and a belt 108C. The belt 108C is wound around the pulley 104C and the pulley 106C to transmit rotational force from the pulley 104C to the pulley 106C. The driving of the drive source 102C can be controlled by the control unit 18.

The rotational motion of the drive source 102C is transmitted to a bush 72 connected to the screw 60, whereby the screw 60 is caused to rotate about its axis. As the screw 60 rotates about the axis, the resin material in the cylinder 58 is fed toward the nozzle 56 of the cylinder 58.

An information acquisition unit 74C is connected to the drive source 102C. The signal corresponding to the torque of the drive source 102C, more specifically, for example, a signal indicating the magnitude of an electric current supplied to the drive source 102C is input to the information acquisition unit 74C. The information acquisition unit 74C supplies information indicating the torque of the drive source 102C, to the control unit 18.

The power transmission device 100C further includes a detection unit 110. The detection unit 110 included in the power transmission device 100C supplies a signal corresponding to the displacement of the belt 108C in the direction intersecting the surface of the belt 108C, to an aftermentioned information acquisition unit 75C.

The information acquisition unit 75C is connected to the detection unit 110 in the power transmission device 100C. The information acquisition unit 75C includes an interface board to which the signal supplied from the detection unit 110 is input. The information acquisition unit 75C determines, for example, whether or not the displacement of the belt 108C is equal to or more than a displacement threshold (i.e., whether the displacement the displacement threshold), based on the signal supplied from the detection unit 110 in the power transmission device 100C. The information acquisition unit 75C supplies the information thus acquired, that is, the information regarding the displacement of the belt 108C, to the control unit 18.

The injection mechanism 68 includes a power transmission device 100D. The power transmission device 100D includes a drive source (motor for linear motion) 102D, a pulley 104D, a pulley 106D, and a belt 108D. The belt 108D is wound around the pulley 104D and the pulley 106D to transmit rotational force from the pulley 104D to the pulley 106D. The driving of the drive source 102D can be controlled by the control unit 18.

The rotational motion of the drive source 102D is converted into the forward/backward motion of the bush 72 by a ball screw mechanism 78 and transmitted to the screw 60. As a result, the screw 60 moves in the axial direction. As the screw 60 moves in the direction toward the nozzle 56, the resin material in the cylinder 58 is injected from the nozzle 56 into the mold 30.

An information acquisition unit 74D is connected to the drive source 102D. For example, a signal corresponding to the torque of the drive source 102D, more specifically, a signal indicating the magnitude of an electric current supplied to the drive source 102D, for example, is input to the information acquisition unit 74D. The information acquisition unit 74D supplies the information indicating the torque of the drive source 102D, to the control unit 18.

The power transmission device 100D further includes a detection unit 110. The detection unit 110 included in the power transmission device 100D supplies a signal corresponding to the displacement of the belt 108D in the direction intersecting the surface of the belt 108D, to an aftermentioned information acquisition unit 75D.

The information acquisition unit 75D is connected to the detection unit 110 included in the power transmission device 100D. The information acquisition unit 75D includes an interface board to which the signal supplied from the detection unit 110 is input. The information acquisition unit 75D determines, for example, whether or not the displacement of the belt 108D is equal to or more than a displacement threshold (i.e., whether the displacement the displacement threshold), based on the signal supplied from the detection unit 110 in the power transmission device 100D. The information acquisition unit 75D supplies the information thus obtained, that is, the information regarding the displacement of the belt 108D, to the control unit 18.

Figure 2:
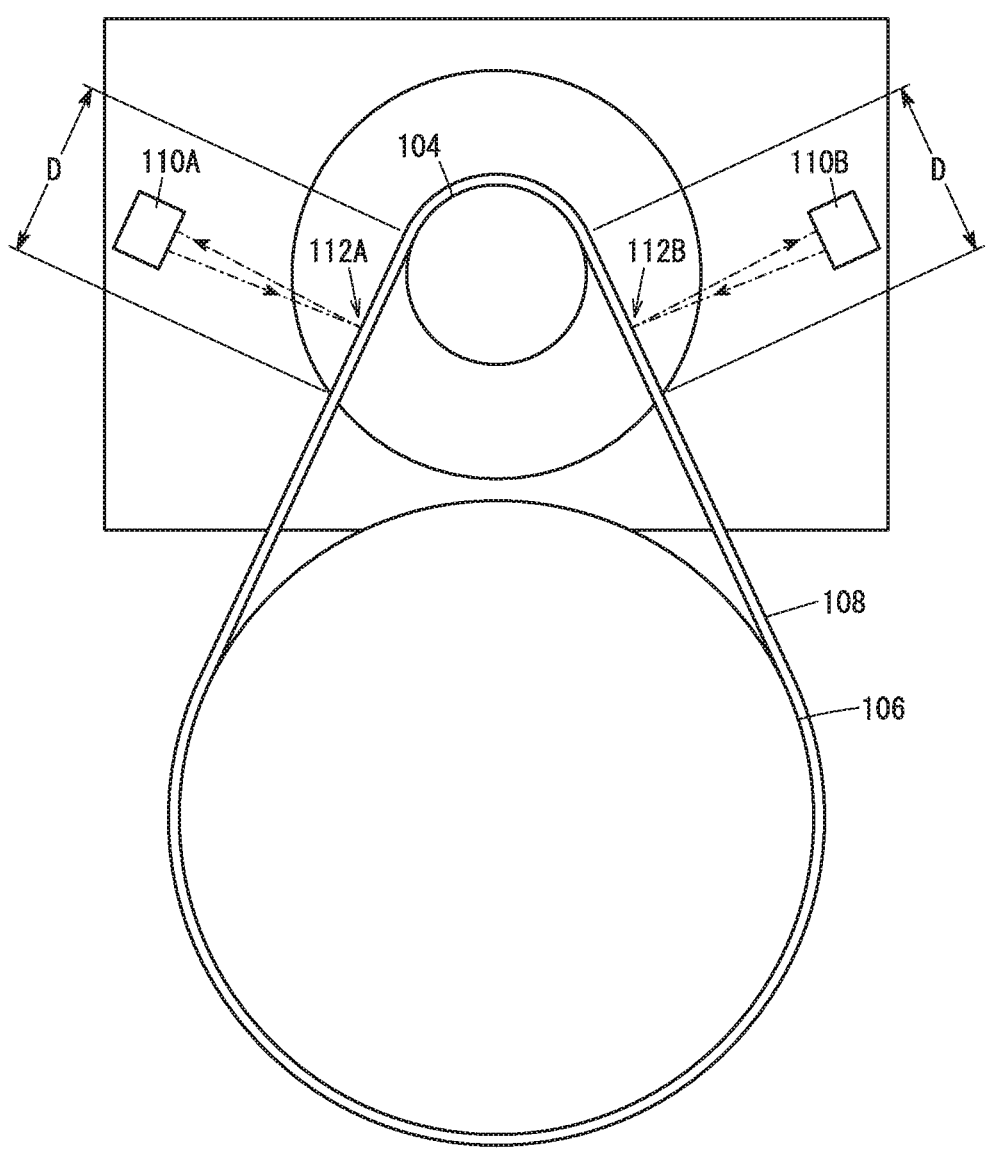
FIG. 2 is a schematic diagram showing a power transmission device according to an embodiment.

FIG. 2 is a schematic diagram showing the power transmission device according to the present embodiment.

As shown in FIG. 2, the power transmission device 100 includes pulleys 104 and 106. The diameter D of the pulley 104 is smaller than that of the pulley 106. The belt 108 is wound around the pulley 104 and the pulley 106. As the belt 108, a toothed belt provided with multiple teeth is used. The pulleys 104 and 106 are provided with multiple teeth that mesh with the teeth of the belt 108. Though description herein will be given on an example where the belt 108 is a toothed belt, the present invention should not be limited to this. Further, the example will be described by giving a configuration where only one belt 108 is wound around the pulleys 104 and 106, but the present invention should not be limited to this.

When the pulley 104 is not rotated by the drive source 102, the tension is uniform in the straight portions of the belt 108. The tension of the belt 108 when the pulley 104 is not rotated by the drive source 102 is called a mounting tension.

When torque is applied to the pulley 104 in the clockwise direction by the drive source 102, the following situation occurs. That is, in a portion of the belt 108 located on the right side of a line connecting the center of the pulley 104 and the center of the pulley 106, a slack occurs, so that the tension in that portion lowers. In this case, a portion of the belt 108 located on the left side of the line connecting the center of the pulley 104 and the center of the pulley 106 is tightened, so that the tension in the portion increases.

When a counterclockwise torque is applied to the pulley 104 by the drive source 102, the following situation takes place. That is, in the portion of the belt 108 located on the left side of the line connecting the center of the pulley 104 and the center of the pulley 106, a slack occurs, so that the tension in that portion lowers. In this case, the portion of the belt 108 located on the right side of the line connecting the center of the pulley 104 and the center of the pulley 106 is tightened, so that the tension in the portion increases.

The side (portion) of the belt 108 where the tension lowers when the pulley 104 is rotated by the drive source 102 is called a slack side. The side (portion) of the belt 108 where the tension increases when the pulley 104 is rotated by the drive source 102 is called a tight side. In this way, when the pulley 104 is rotated by the drive source 102, the belt 108 has a slack side and a tight side. The tension of the belt 108 on the slack side is called slack side tension. The tension of the belt 108 on the tight side is called tight side tension. The tension for rotating the pulley 104 is called effective tension. When the effective tension is denoted by Te, the tension on the slack side is denoted by Ts, and the tension on the tight side is denoted by Tt, the relationship represented by the following expression (1) holds.

$$Te = Tt - Ts \tag{1}$$

As the torque of the drive source 102 is increased, slackness increases on the slack side and tension (tightness) increases on the tight side. That is, as the torque of the drive source 102 is increased, the tension on the slack side lowers while the tension on the tight side increases.

When the mounting tension of the belt 108 is appropriate, the relationship represented by the following expression (2) holds:

$$T_0 > T_{max}/2 \tag{2}$$

where $T_0$ is the mounting tension, and $T_{max}$ is a tension when the maximum torque $Tr_{max}$ arises.

In such a case, even if the torque of the drive source 102 rises to the maximum torque $Tr_{max}$ under a normal use condition, the slack side tension does not become zero. However, the mounting tension of the belt 108 lowers due to deterioration as it is repeatedly used. When the mounting tension of the belt 108 is lowered to some extent, or when the initial mounting tension is not appropriate, the relationship of the following expression (3) holds.

$$T_0 < T_{max}/2 \tag{3}$$

In this case, the slack side tension becomes zero before the torque of the drive source 102 rises to the maximum torque $\text{Tr}_{max}$ even under a normal use condition.

When the slack side tension reaches zero, the belt 108 is displaced in the direction intersecting the surface of the belt 108. If the belt 108 is continuously used with the belt 108 displaced in the direction intersecting the surface thereof, this may shorten the life of the belt 108, or cause breakage of the belt at an early stage (i.e., premature failure). Therefore, when the mounting tension of the belt 108 becomes lowered to some extent, it is preferable that the mounting tension of the belt 108 should be adjusted by the user or the like. To deal with this, in the present embodiment, the detection units 110A and 110B are used to detect whether or not the mounting tension of the belt 108 has lowered to a certain extent.

The detection unit 110A is arranged on one side of the line connecting the center of the pulley 104 and the center of the pulley 106. The detection unit 110B is provided on the other side of the line connecting the center of the pulley 104 and the center of the pulley 106. The detection units 110A and 110B detect the displacement of the belt 108 in the direction intersecting the surface of the belt 108. The detection unit 110A detects the displacement of a portion of the belt 108 located on the one side of the line connecting the center of the pulley 104 and the center of the pulley 106. The detection unit 110A can detect the displacement of the belt 108 when a counterclockwise torque is applied to the pulley 104 by the drive source 102. The detection unit 110B detects the displacement of a portion of the belt 108 located on the other side of the line connecting the center of the pulley 104 and the center of the pulley 106. The detection unit 110B can detect the displacement of the belt 108 when a clockwise torque is applied to the pulley 104 by the drive source 102. In this embodiment, since the detection units 110 are arranged on both sides of the line connecting the center of the pulley 104 and the center of the pulley 106, decrease in the mounting tension of the belt 108 can be detected regardless of the direction of the torque applied to the pulley 104. The detection unit 110A detects the displacement of the belt 108 occurring at a predetermined measuring point 112A. The detection unit 110B detects the displacement of the belt 108 occurring at a predetermined measuring point 112B. Reference numeral 112 is used to describe measuring points when general mention is made, and reference numerals 112A and 112B are used to describe individual measuring points. As the detection unit 110, for example, a detector that can emit a laser beam on a measurement target and detect the displacement of the measurement target based on the reflected light from the measurement target is used. However, the detector should not be limited thereto. In the example herein, a non-contact type detector is used as the detection unit 110, but the detection unit 110 may employ a contact type detector. The information acquired by the detection unit 110, that is, the information regarding the displacement of the belt 108, is supplied to the information acquisition unit 75 as described above.

As described above, the detection units 110A and 110B supply the information acquisition unit 75 with a signal corresponding to the displacement of the belt 108 in the direction intersecting the surface of the belt 108. The information acquisition unit 75 determines, for example, whether or not the displacement of the belt 108 is equal to or greater than a displacement threshold, based on the signal supplied from the detection unit 110. The displacement threshold is a threshold on which the determination on whether a displacement of the belt 108 has occurred is based, as described above. The information acquisition unit 75 supplies the information thus acquired, that is, the information regarding the displacement of the belt 108, to the control unit 18. A state in which the displacement of the belt 108 is more than the displacement threshold under the normal use condition means that the mounting tension of the belt 108 is lowered to a certain extent, that is, the mounting tension of the belt 108 is not appropriate.

The distance from the border between a portion where the belt 108 and the pulley 104 are in contact and a portion where the belt 108 and the pulley 104 are not in contact, to the measuring point 112 is specified to be equal to or smaller than the diameter D of the pulley 104. The reason why the displacement of the belt 108 is detected at the measuring point 112 thus defined in the embodiment, is that the displacement of the belt 108 due to slackness of the belt 108 is likely to occur in such a measuring point. According to the present embodiment, since the displacement of the belt 108 is measured at the thus defined measuring point 112, it is possible to reliably detect the displacement of the belt 108 due to a decrease in the mounting tension of the belt 108. The reason why the displacement of the belt 108 due to a lowering of the mounting tension of the belt 108 is likely to occur in the thus defined area is that the contact area between the belt 108 and the pulley 104 is smaller, that is, the number of teeth in the area where the teeth of the belt 108 mesh with the teeth of the pulley 104 is smaller.

The control unit 18 governs the whole of the industrial machine 10. The control unit 18 includes a processing unit 114 and a storage unit 116. The processing unit 114 can be configured by, for example, a CPU (Central Processing Unit) or the like, but is not limited to this. The storage unit 116 includes, for example, an unillustrated volatile memory and an unillustrated nonvolatile memory. Examples of the volatile memory include RAM (Random Access Memory) and the like. Examples of the non-volatile memory include ROM (Read Only Memory) and flash memory. Programs, data, tables, etc. may be stored in the storage unit 116. The control unit 18 supplies, to the display unit 118, information regarding the displacement of the belt 108 when the drive source 102 is rotated, based on the information acquired by the detection unit 110. The display unit 118 can display, on an unillustrated display screen, information regarding the displacement of the belt 108 when the drive source 102 is rotated, based on the information supplied from the control unit 18. The control unit 18 may display information regarding the torque of the drive source 102 and the information on the displacement of the belt 108 when the drive source 102 is rotated, on the display screen of the display unit 118. In addition, the control unit 18 can display information indicating whether or not an abnormality has occurred in the belt 108, more specifically, whether or not the mounting tension of the belt 108 has lowered by a predetermined amount or more, on the display screen of the display unit 118.

The user can grasp whether or not the mounting tension of the belt 108 has lowered, based on the information displayed on the display unit 118. When the user recognizes that the mounting tension of the belt 108 has lowered, the mounting tension of the belt 108 may be adjusted.

The processing unit 114 includes an acquisition unit (calculation unit, determination unit) 120. The acquisition unit 120 can be realized by the processing unit 114 executing a program stored in the storage unit 116. The acquisition unit 120 can acquire the information on the mounting tension of the belt 108, based on information corresponding to the torque of the drive source 102 and information regarding the displacement of the belt 108.

Figure 3:
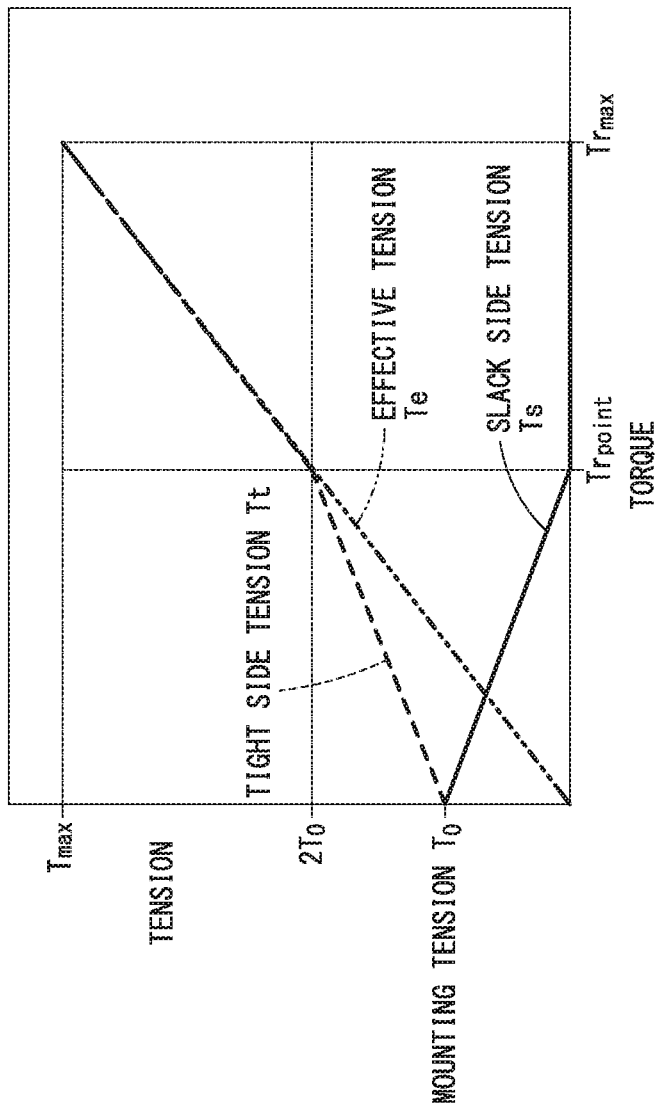
FIG. 3 is a graph showing the relationship between the torque of a drive source and the tension of a belt.
Figure 4:
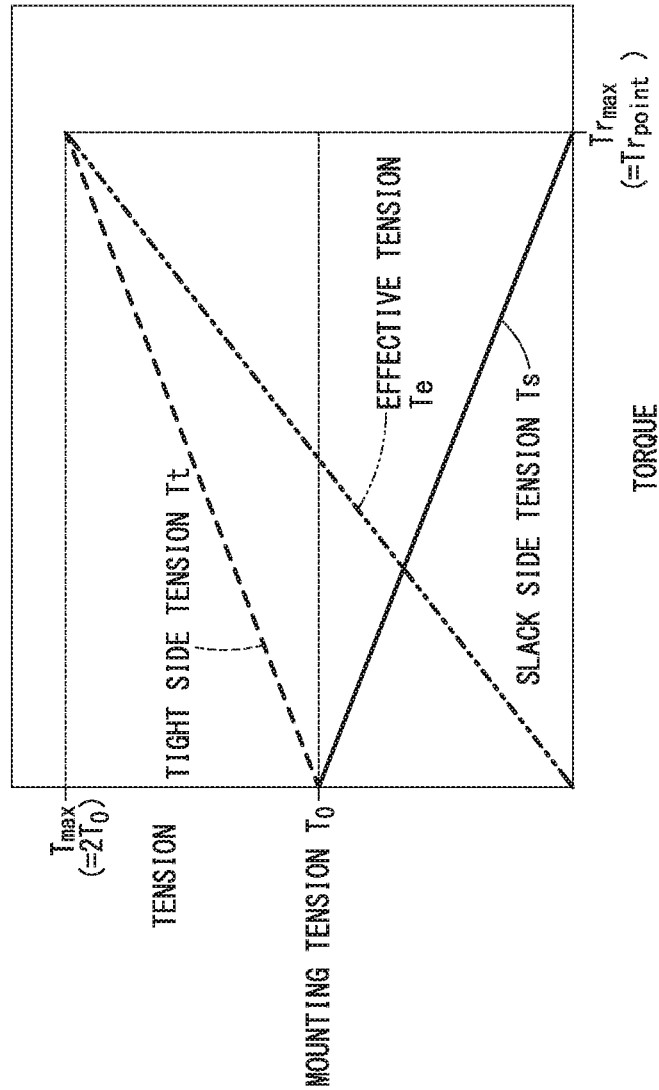
FIG. 4 is a graph showing the relationship between the torque of a drive source and the tension of a belt.

FIGS. 3 and 4 are graphs showing the relationships between the torque of the drive source and the tension of the belt. The horizontal axis represents the torque of the drive source 102. The vertical axis represents the tension of the belt 108. FIG. 3 shows an example where $T_0<T_{max}/2$. FIG. 4 shows an example where $T_0=T_{max}/2$. As described above, $T_0$ is the mounting tension, and $T_{max}$ is the tension when the maximum torque $Tr_{max}$ is generated.

The tension of the belt 108 when the torque of the drive source 102 is zero corresponds to the mounting tension $T_0$ of the belt 108. The solid lines in FIGS. 3 and 4 indicate the tension generated on the slack side of the belt 108, that is, the slack side tension Ts. The broken lines in FIGS. 3 and 4 indicate the tension generated on the tight side of the belt 108, that is, the tight side tension Tt. The two-dot chain lines in FIGS. 3 and 4 indicate the effective tension Te.

As shown in FIGS. 3 and 4, as the torque of the drive source 102 increases, the tension on the slack side gradually lowers while the tension on the tight side gradually increases.

In a case where $T_0<T_{max}/2$, as the torque of the drive source 102 is further increased as shown in FIG. 3, the belt 108 starts to be displaced in the direction intersecting the surface of the belt 108. $Tr_{point}$ is the torque when the belt 108 starts to be displayed. When the torque of the drive source 102 is further increased, the displacement of the belt 108 in the direction intersecting the surface of the belt 108 reaches and exceeds the displacement threshold. As described above, when the displacement of the belt 108 becomes equal to or greater than the displacement threshold, the information acquisition unit 75 detects occurrence of displacement of the belt 108. When the torque of the drive source 102 is in a range between $Tr_{point}$ and $Tr_{max}$, the displacement of the belt 108 in the direction intersecting the surface of the belt 108 increases as the torque of the drive source 102 increases.

The following relationship holds between torque, tension, and pulley pitch radius.

Torque=Tension×Pulley Pitch Radius

The tight side tension Tt when the torque of the drive source 102 is $Tr_{point}$ is $2T_0$, as can be seen from FIG. 3. Therefore, assuming that the pitch diameter of the pulley 104 is D', the following equation (4) holds.

$$Tr_{point}=2T_0\cdot(D'/2) \qquad (4)$$

Equation (4) can be rewritten into the following equation (5).

$$T_0=Tr_{point}/D' \qquad (5)$$

Thus, the above relationship holds between the mounting tension $T_0$ and the torque $Tr_{point}$ when the belt 108 starts to be displaced.

In a case where $T_0=T_{max}/2$, when the torque of the drive source 102 reaches the maximum torque $Tr_{max}$, the slack side tension Ts becomes zero, as shown in FIG. 4. That is, in the case of $T_0=T_{max}/2$, the belt 108 starts to be displaced in the direction intersecting the surface of the belt 108 when the torque of the drive source 102 reaches the maximum torque $Tr_{max}$.

The acquisition unit 120 can acquire the information about the mounting tension of the belt 108, based on the torque of the drive source 102 when a displacement equal to or more than the displacement threshold starts to occur in the belt 108. More specifically, the acquisition unit 120 can acquire the mounting tension of the belt 108, for example, based on the torque of the drive source 102 when the displacement of the belt 108 becomes equal to or more than the displacement threshold.

In acquiring the mounting tension of the belt 108, for example, a table may be used that shows the relationship between the torque of the drive source 102 and the mounting tension of the belt 108 when a displacement equal to or more than the displacement threshold starts to occur in the belt 108. This table is stored in the storage unit 116, for example. The acquisition unit 120 can acquire the mounting tension of the belt 108 by appropriately using this table.

Here, the case where the mounting tension of the belt 108 is acquired using a table has been described as an example, but the present invention should not be limited to this. For example, the mounting tension of the belt 108 may be calculated by the acquisition unit 120 based on the torque of the drive source 102 when a displacement equal to or greater than the displacement threshold begins to occur in the belt 108, the diameters of the pulleys 104 and 106, the distance between the rotation axis of the pulley 104 and the rotation axis of the pulley 106, and the like.

Further, in the above, the case where the mounting tension of the belt 108 is acquired has been described as an example, but the present invention should not be limited to this. If a certain amount of torque is generated by the drive source 102, then detecting whether or not a displacement of the belt 108 equal to or greater than a threshold occurs may suffice. As long as it is possible to detect that the mounting tension of the belt 108 has lowered to a certain extent, it is possible to urge the user to adjust the mounting tension of the belt 108, even without acquisition of the mounting tension itself of the belt 108.

As has been described heretofore, according to the present embodiment, the displacement of the belt 108 at the predetermined measuring point 112 is detected by the detection unit 110. The distance from the border between the portion where the belt 108 and the pulley 104 are in contact and the portion where the belt 108 and the pulley 104 are not in contact, to the measuring point 112 is equal to or smaller than the diameter D of the pulley 104. The displacement of the belt 108 is likely to occur at such a measuring point 112. Therefore, according to the present embodiment, it is possible to provide a power transmission device 100 that can beneficially detect a decrease in the mounting tension of the belt 108.

Modified Embodiment

Though the preferred embodiment of the present invention has been described above, the present invention should not be limited to the above embodiment, and various modifications can be made without departing from the gist of the present invention.

For example, the above embodiment has been described by giving an example where the industrial machine 10 is an injection molding machine, but the invention is not limited to this. The present invention can be applied to various industrial machines 10 other than injection molding machines, such as machine tools, robots, mining machines, woodworking machines, agricultural machines, and construction machines.

The above embodiment has been described by giving an example where the power transmission device 100 is provided in the industrial machine 10, but the present invention is not limited to this. The power transmission device 100 may be included in any device. For example, the power transmission device 100 may be provided in a vehicle or the like.

The above embodiment has been described by giving an example where the pulley 104 is a driving pulley and the pulley 106 is a driven pulley. That is, the example has been described by taking a case where the pulley 104 having a relatively small diameter is a driving pulley while the pulley 106 having a relatively large diameter is a driven pulley. However, the present invention is not limited to this. The pulley 106 having a relatively large diameter may be a driving pulley while the pulley 104 having a relatively small diameter may be a driven pulley.

The above embodiment has been described by giving an example where the diameter of the pulley 104 and the diameter of the pulley 106 are different, but the present invention is not limited to this. The pulley 104 and the pulley 106 may have the same diameter. In this case, either of the pulley 104 and the pulley 106 can be a driving pulley.

Further, the above embodiment has been described by giving an example where the signal output from the detection unit 110 is input to the information acquisition unit 75, and the information indicating whether or not the displacement of the belt 108 has occurred is supplied from the information acquisition unit 75 to the control unit 18. However, the present invention is not limited to this. The signal output from the detection unit 110 may be supplied to the control unit 18. In this case, the control unit 18 includes an information acquisition unit 75 that determines whether or not the displacement of the belt 108 that is equal to or more than the displacement threshold has occurred.

The above embodiments are summarized as follows.

The power transmission device (100) includes: a first pulley (104); a second pulley (106) having a diameter equal to or larger than a diameter (D) of the first pulley; a belt (108) wound around the first pulley and the second pulley; and a detection unit (110A, 110B) configured to detect a displacement of the belt in a direction intersecting the surface of the belt. The detection unit is configured to detect the displacement of the belt at a predetermined measuring point (112A, 112B). The distance from the border between the portion where the belt and the first pulley are in contact with each other and the portion where the belt and the first pulley are not in contact with each other, to the measuring point is equal to or smaller than the diameter (D) of the first pulley. The displacement of the belt is liable to occur at the above-defined measuring position. Therefore, this configuration makes it possible to beneficially detect a decrease in the mounting tension of the belt.

The detection unit may be arranged on one side of the line connecting the center of the first pulley and the center of the second pulley.

The detection unit may be arranged on each of both sides of the line connecting the center of the first pulley and the center of the second pulley. With this configuration, it is possible to reliably detect a decrease in the tension of the belt when a clockwise torque is applied to the first pulley and also when a counterclockwise torque is applied to the first pulley.

The power transmission device may further include a display unit (118) configured to display information regarding the displacement, based on the information acquired by the detection unit. This configuration enables the operator to perform appropriate adjustment of the mounting tension and the like based on the information displayed on the display unit.

The power transmission device may further include an acquisition unit (120) configured to acquire information regarding the mounting tension of the belt, based on the displacement and information that corresponds to the torque of a drive source configured to rotate the first pulley or the second pulley. This configuration makes it possible to beneficially acquire information regarding the mounting tension of the belt.

The acquisition unit may be configured to acquire the mounting tension of the belt, based on the displacement and the information that corresponds to the torque of the drive source. This configuration makes it possible to beneficially acquire the mounting tension of the belt.

An industrial machine (10) includes the above power transmission device.

What is claimed is:

1. A power transmission device, comprising:
   a first pulley;
   a second pulley having a diameter equal to or larger than a diameter of the first pulley;
   a belt wound around the first pulley and the second pulley; and
   a detection unit configured to detect a displacement of the belt in a direction intersecting a surface of the belt, wherein:
   the detection unit is configured to detect the displacement of the belt at a predetermined measuring point;
   a distance from a border between a portion where the belt and the first pulley are in contact with each other and a portion where the belt and the first pulley are not in contact with each other, to the measuring point is equal to or smaller than the diameter of the first pulley; and
   an acquisition unit configured to acquire information regarding a mounting tension of the belt, based on the displacement and information that corresponds to a torque of a drive source configured to rotate the first pulley or the second pulley.

2. An industrial machine comprising a power transmission device according to claim 1.

3. The power transmission device according to claim 1, wherein the information that corresponds to the torque is information that indicates a magnitude of electric current that is supplied to the drive source.

4. The power transmission device according to claim 1, wherein the detection unit is arranged on one side of a line connecting a center of the first pulley and a center of the second pulley.

5. An industrial machine comprising a power transmission device according to claim 4.

6. The power transmission device according to claim 1, wherein the detection unit is arranged on each of both sides of a line connecting a center of the first pulley and a center of the second pulley.

7. An industrial machine comprising a power transmission device according to claim 6.

8. The power transmission device according to claim 1, wherein the acquisition unit is configured to acquire the mounting tension of the belt, based on the displacement and the information that corresponds to the torque of the drive source.

9. An industrial machine comprising a power transmission device according to claim 8.

10. The power transmission device according to claim 1, further comprising a display unit configured to display information regarding the displacement, based on information acquired by the detection unit.

11. An industrial machine comprising a power transmission device according to claim 10.

12. The power transmission device according to claim 10, further comprising an acquisition unit configured to acquire information regarding a mounting tension of the belt, based on the displacement and information that corresponds to a torque of a drive source configured to rotate the first pulley or the second pulley.

13. An industrial machine comprising a power transmission device according to claim 12.

14. The power transmission device according to claim 12, wherein the acquisition unit is configured to acquire the mounting tension of the belt, based on the displacement and the information that corresponds to the torque of the drive source.

15. An industrial machine comprising a power transmission device according to claim 14.

16. The power transmission device according to claim 1, wherein the detection unit is a belt detection unit and the displacement is a belt displacement, wherein the belt detection unit is configured to detect the belt displacement of the belt in a direction intersecting a surface of the belt, the belt displacement including a first displacement of the belt on first side of the first pulley and a second displacement of the belt on a second side of the first pulley, wherein:

the belt detection unit includes a first detector unit and a second detector unit, the first detector unit is configured to detect the first displacement of the belt at a first predetermined measuring point, the second detector unit is configured to detect the second displacement of the belt at a second predetermined measuring point; and the distance from the border between the portion where the belt and the first pulley are in contact with each other and the portion where the belt and the first pulley are not in contact with each other, to the first or second predetermined measuring points where such distance is equal to or smaller than the diameter of the first pulley, each of the first and second predetermined measuring points being disposed at respective locations along the belt where the belt and the first pulley are not in contact with each other.

17. The power transmission device according to claim 16, wherein the first and second detector units are contact detector units that contact the belt.

18. The power transmission device according to claim 16, wherein the first and second detector units are non-contact detector units that are spaced apart from the belt.

19. The power transmission device according to claim 18, wherein at least one of the non-contact detector units is configured to emit light to a respective one of the first or second predetermined measuring points.

\* \* \* \* \*